United States Patent [19]

Hansen et al.

[11] Patent Number: 4,554,304

[45] Date of Patent: Nov. 19, 1985

[54] HOT MELT BUTYLENE/ETHYLENE ADHESIVES

[75] Inventors: David R. Hansen; William H. Korcz, both of Houston, Tex.

[73] Assignee: Shell Oil Company, Houston, Tex.

[21] Appl. No.: 615,850

[22] Filed: May 31, 1984

[51] Int. Cl.[4] .................. C08K 5/13; C08L 51/06; C08L 53/02; C08L 71/08
[52] U.S. Cl. ........................... 524/291; 524/488; 524/504; 524/505; 525/71; 525/74; 525/78; 526/935
[58] Field of Search ............... 525/71, 74, 78; 524/270, 488, 287, 504, 291, 505

[56] References Cited

U.S. PATENT DOCUMENTS

| | | | |
|---|---|---|---|
| 4,087,587 | 5/1978 | Shida et al. | 525/74 |
| 4,299,745 | 11/1981 | Godfrey | 525/74 |
| 4,359,551 | 11/1982 | Suda et al. | 525/71 |
| 4,394,485 | 7/1983 | Adar | 525/71 |
| 4,409,364 | 10/1983 | Schmukler et al. | 525/74 |
| 4,460,745 | 7/1984 | Adar et al. | 525/74 |

*Primary Examiner*—Allan M. Lieberman
*Attorney, Agent, or Firm*—Jennifer R. Daunis

[57] ABSTRACT

Hot melt adhesives with long open time good bonding to cold metals are made of blends of a maleic anhydride modified copolymer of butene-1 and ethylene, an aliphatic, substantially non-polar resin, a antioxidizing agent and, optionally, microcrystalline wax, a block copolymer and atactic polypropylene.

4 Claims, 1 Drawing Figure

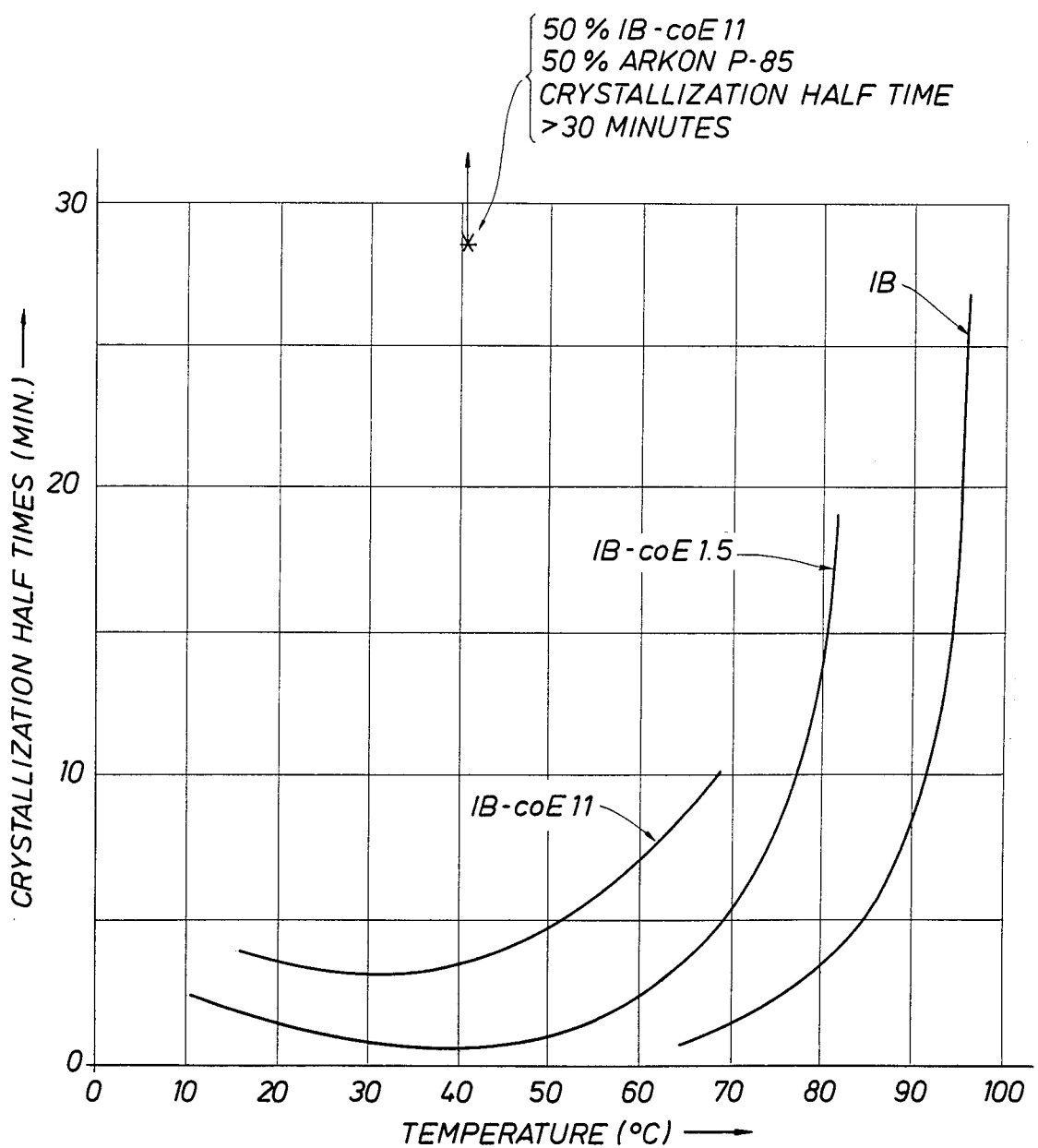

HOT MELT BUTYLENE/ETHYLENE ADHESIVES

BACKGROUND OF THE INVENTION

This invention relates to hot melt adhesives which exhibit good cold metal bonding and a long open time. In particular, this invention relates to hot melt butene-1 and ethylene copolymer adhesives.

Adhesive open time which we are referring to is the maximum time at which auto-adhesion (adhesive to itself or to a substrate) can take place for material after it is cooled from the melt to room temperature. Hot melt adhesives which exhibit a long open time (greater than 20 minutes), as well as good cold metal bonding, have long been sought for various applications which require a long open time. For example, expansive surfaces to be coated by adhesives such as table tops to which formica is bonded or assembly line auto parts which are coated with adhesive and later contacted with other parts at some point further down the assembly line are particularly suited to the use of hot melt adhesives which display long open times. Sometimes adhesive coated parts must remain uncontacted for as long as several hours, and thus, required longer open times than are exhibited by and characteristic of other polymers typically used in nonpressure sensitive hot melt adhesives.

Hot melt adhesives can be formulated to be pressure sensitive and have an infinite open time but these adhesives are usually soft, tacky and have limited strength and adhesion. Conventional hot melts such as formulations of ethylene vinylacetate, polyethylenes, polyamides, or polyesters are rigid, form good strong bonds to certain substrates but have short open times usually less than 1 minute. Moreover, these adhesives usually have problems in adhearing to cold metal substrates which is often required for assembly line production.

Solvent applied contact adhesives can be formulated to give good bond strengths and reasonable open times but they require the use of solvents which can be a toxant, a pollutant and a fire hazard. The polybutylene adhesives are unique in that they require no solvents, have long open times, and show improved adhesion to cold metal substrates.

The poly-1 butene polymers are a unique group of olefinic polymers because they crystallize very slowly. The very slow crystallization rate in contrast to the crystallization rates of other polyolefin crystalline polymers such as EVAs, polyethylenes and polypropylenes, has been found, to be beneficial in formulating hot melt adhesives which have very long open times as well as good adhesion and bonding to cold, heat-sink type substrates—metals such as stainless steel and anodized aluminum for example.

U.S. Pat. No. 3,573,240 describes hot melt adhesive compositions for hard cover book binding. The nature of the book binding process is such that an adhesive which rapidly sets and which has an extremely short open time is desired. Column 4, lines 1 through 7 of '240 disclose that minor amounts i.e., up to about 5% by weight of alpha olefin comonomers such as ethylene and propylene may be present in the butene-1 polymerization system without any substantial loss of the desirable properties displayed by the resultant essentially homopolymeric system. '240 also states in column 2, lines 61 through 63 that the hot melt adhesive products of '240 display good heat stability and rapid setting speed. Thus, '240 teaches that even though up to about 5% by weight of ethylene may be added to the butene-1 polymerization system, the polymerization system exhibits rapid setting speed (short open time). Thus, '240 is inopposite from the teachings of the present invention—that the addition of small amounts of ethylene to the butene-1 polymer in combination with certain resins of the present invention results in extremely long open time.

Polybutylene polymers are composed of linear chain molecules with the regular and spacially ordered arrangement of ethyl side groups, the pendant groups that result when one butene is polymerized across the 1,2 carbon double bond (along an ethylene chain backbone) (U.S. Pat. No. 3,362,940. When cooled from melt, the ethyl side groups initially align in a tetragonal spatial arrangement, developing a little over one half of the ultimate crystallinity (form II). With time, the tetragonal crystalline phase transforms into a stable hexagonal spatial arrangement with subsequent development of additional crystallinity (form I). This is a very slow process, the transformation being completed in the neat polymer over a period of several days.

Butene-1 can be copolymerized with a variety of alpha-olefins to provide useful copolymers such as those taught in U.S. Pat. No. 3,362,940. Butene-1/ethylene copolymers, with ethylene in the 11-20 mole percent range are of special interest in hot melt adhesives, as the ethylene comonomer produces a lower glass transition temperature (Tg) amorphous phase, reduces further the crystallization rate, and reduces the ultimate level of crystallinity in the polymer. Such are advantages in the development of long open time melt adhesives, as a lower Tg polymer and a higher amorphous phase polymer offers wider formulating latitude in combination with compatible resins, waxes, oils, fillers and additives.

The adhesion of polyolefins to various substrates can be improved by incorporating functionality into the chain by copolymerization or by grafting. Ethylene acrylic acid copolymers are examples of olefin copolymers. There are examples of polypropylene and polyethylene being grafted with maleic anhydride or anhydride derivatives using a free radical (peroxide and heat) which teach that adhesion to substrates such as nylon and glass can be improved.

SUMMARY OF THE INVENTION

It has been surprisingly found that the relatively slow recrystallization from melt rate exhibited by polybutene-1/ethylene copolymers where the ethylene content of the copolymers is from about 5.5 percent by weight to about 10% by weight and which has been maleic anhydride functionalized according to the process detailed herein, and when such copolymers are combined with tackifying resins, antioxidant an optional amount of a microcrytalline wax, an optional amount of block copolymer comprising at least one monoalkylenyl arene polymer end block A and at least one substantially completely hydrogenated conjugated diene second block B, and an optional amount of atactic polypropylene, results in long open time. The adhesive formulations of the present invention exhibit extremely long open time of greater than 20 minutes and in some case greater than 300 minutes (5 hours). In addition, such hot melt adhesives bond well to glass, as well as cold substrates such as stainless steel and anodized aluminum. The adhesives of the present invention possess good adhesive strength, are flexible, have sufficiently low melt viscosities. In addition, the shear adhesion failure temperature (SAFT or service temperature) may be controlled to remain sufficiently high for the product applications of this invention, and T-peel values are high.

Other product uses of the adhesive of the present invention include but are not limited to use as a contact adhesive for assembly of furniture, miscellaneous robot assembly, as an automotive sealant and to improve open time in bonding.

DRAWINGS

FIG. 1 is a graph of crystallization half times versus temperature for various polybutylene polymers and one polybutylene adhesive formulation.

DETAILED DESCRIPTION OF THE INVENTION

The copolymer of the present invention is a polybutene-1 copolymer with from about 5.5% by weight (11 mole percent) to about 10% by weight (20 mole percent) ethylene. Polymers discussed herein are identified as H-1 B (homopolymeric 1-butene), 1B-CoE 1.5 (1.5 mole percent coethylene in 1-butene) and 1B-coE 11.0 (11.0 mole percent coethylene in 1-butene).

A summary of polybutylene neat polymer properties contrasting homopolymer butene-1 with coethylene butene-1 polymers is shown in Table 1. The 1-B-coE 1.5 copolymer is the butene-1 ethylene copolymer containing 1.5 mole percent (0.75 percent by weight) ethylene while the third copolymer contains 11.0 mole percent (5.5 percent by weight) ethylene. The Tg for the 11 mole percent ethylene/butene-1 copolymer is substantially lower than that of the butylene homopolymer and the 1.5 mole percent ethylene butene-1 copolymer.

TABLE 1

Physical Properties of Polybutylene Polymers

| Property Units | $T_m^{(1)}$, °C. | $T_g^{(2)}$, °C. | Tensile Yield$^{(3)}$, mPa (psi) | Tensile/ Elongation$^{(3)}$ mPa (psi)/% |
|---|---|---|---|---|
| Hompolymers | | | | |
| melt index$^{(4)}$ of 1.8 to 20$^{(5)}$ | 125 | −25 | 13.8 (2000)$^{(a)}$ | $^{(b)}$/350$^{(a)}$ |
| 1B-coE1.5 | | | | |
| melt index 2.0 | 110 | −26 | 11.7 (1700)$^{(a)}$ | 31.0 (4500)$^{(a)}$/350$^{(a)}$ |
| melt index 100$^{(5)}$ | 107 | −26 | 11.0 (1600) | 28.3 (4100)/390 |
| 1B-coE11.0 | | | | |
| melt index 0.2 | 102 | −34 | 5.52 (800) | 23.7 (3440)/490 |
| melt index 20$^{(5)}$ | 100 | −34 | 5.66 (820) | 27.6 (4010)/520 |
| melt index 99$^{(5)}$ | 99 | −34 | 5.45 (790) | 21.7 (3150)/480 |

$^{(1)(2)}$Crystalline melting temperature ($T_m$) and glass transition temperature (Tg) as determined by Differential Scanning Calorimetry.
$^{(3)}$ASTM D-638, type "C"die @ 50 cm/minute.
$^{(4)}$ASTM D-1238, condition E.
$^{(5)}$Cracked from low melt flow using a Brabender extruder and peroxides.
$^{(a)}$Nominal value.
$^{(b)}$Nominal values in range of 29.0–31.0 mPa (4200–4500 psi).

The polybutylene polymers can be made to a wide range of melt flow as shown in Table 1 by cracking them in an extruder with heat and peroxides. A functional melt flow 1B-coE 11.0 with a melt flow of 0.2 can be changed to a melt flow of 99 by passing it through an extruder with 1000 ppm of Lupersol 101 peroxide from Pennwalt. The average residence time in the extruder was 2 minutes at 200° C.

The cracking process also lends itself to a grafting of the polybutylenes with monomers which are capable of undergoing a reaction with free radicals. Some examples would be vinyl silanes, acrylic acid, maleic anhydride, methacrylates, acrylates, styrene, acrylonitrile, vinyl chloride, vinyl esters, and associated derivatives of the various groups mentioned. Of particular interest is the maleic anhydride and associated derivatives because they are easy to graft and significantly promote adhesion to substrates such as nylon, aluminum, metals in general, silane treated glass, etc.

Grafting can be carried out with the polybutylenes by simply mixing maleic anhydride with the appropriate polybutylene and peroxide and then passing the mixture through a heated extruder.

The content of maleic anhydride in the polybutylene polymer can be from 0.05% to about 5% by weight, preferably from about 0.05% to about 1.5% by weight. The polybutylene polymer grafted with the maleic anhydride was 1B-coE11.0.

Added to the butene-1 ethylene copolymer mixture is a non-polar tackifier resin. Included in the definition of substantially non-polar are the polyterpene resins. For the most part, partially hydrogenated C$_9$ based hydrocarbon resins with softening points in a range of 70° C. to 125° C., as well as C$_5$ stream resins, and polyterpenes are used in amounts of from about 20% by weight to about 60% by weight and preferably 50% by weight. Arkon P-85 was used which shows a melting point and a Tg above room temperature; $T_m=47°$ C., $T_g=35°$ C. Blends with polybutylene are clear with no color.

The waxes of the present invention are microcrystalline waxes, however, paraffinic waxes were used as a contrast with the present invention and are identified with corresponding melting points. The waxes are optional and may be from about 10% by weight to about 20% by weight of the adhesive composition. Shellwax ® 500 was used. A sufficient amount of the wax, preferably 10% by weight, can be used, if desired, to effect a lower viscosity without a substantial decrease in service temperature of the adhesive.

From about 0.1% by weight to about 0.5% by weight, preferably from about 0.2% by weight to about 0.4% by weight of hindered phenolic antioxidant was used. Unless otherwise noted, tetrakis methylene (3,5 di-tert-butyl-4-hydroxyhydrocinnamate) methane was used at level of 0.3% by weight.

Optionally, atactic polypropylene (AFAX 510) may be added in amounts of from about 0% by weight to about 40% by weight to give good T-peel values. Preferably about 25% by weight is added. The Arkon P-85 is reduced accordingly, to provide for the APP.

A block copolymer, (KRATON ®G 1657 (styrene-coethylene butylene-styrene from Shell Chemical), a SEB (styrene-coethylene butylene copolymer) diblock polymer, for example), may be optionally added in amounts of from about 0% by weight to about 35% by weight, preferably about 20% by weight. The block copolymer comprises at least one monoalkenyl arene polymer end block A and at least one substantially completely hydrogenated conjugated diene (isoprene or butadiene) second block B, said block copolymer having an 8 to 55 percent by weight monoalkenyl arene polymer block content, each polymer block A having an average molecular weight of between about 4,000 and about 125,000, and each polymer block B having an average molecular weight of between about 10,000 and about 300,000.

The block copolymers employed in the present invention may have a variety of geometrical structures, since the invention does not depend on any specific geometrical structure, but rather upon the chemical constitution of each of the polymer blocks. Thus, the structures may be linear, radial or branched so long as each copolymer has at least one polymer end block A and at least one polymer second block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with multifunctional coupling agents such as dihaloalkanes or -alkenes and divinyl benzene as well as certain polar compounds such as silicon halides, siloxanes or esters of monohydric alcohols with carboxylic acids.

EXAMPLE I

Adhesive Preparation

The polybutylene polymers were cracked by tumbling the polybutylene pellets with the peroxide (Lupersol 101) at 0–2000 ppm. The mixture was passed through a Brabender extruder at 200° C. The rpm for the extruder was adjusted to achieve a 2 minute average residence time in the extruder.

Polybutylene polymers functionalized with maleic anhydride were prepared by mixing polybutylene pellets with a peroxide (Lupersol 101) at 2000–10000 ppm and the appropriate amount of maleic anhydride. The mixture was passed through a heated extruder. The temperature of the extruder was chosen so as to melt the polybutylene and to cause >75% of the peroxide to decompose into reactive free radicals. Typically 1000–4000 ppm of a peroxide (Lupersol 101) was used with 0.1 % to 5% maleic anhydride. A Brabender extruder heated to 200° C. was used. The rpm of the extruder was chosen to obtain a 2 minute residence time. Table 2 shows the various functionalized polybutylene polymers that were made.

TABLE 2
POLYBUTYLENE FUNCTIONALIZED WITH MALEIC ANHYDRIDE

| POLYBUTYLENE | MELT INDEX | wt % MALEIC ANHYDRIDE |
| --- | --- | --- |
| PB-M1[1] 1B-coE11.0 | 48 | 0.1 |
| PB-M2[1] 1B-coE11.0 | 27 | 1.0 |
| PB-M3[2] 1B-coE11.0 | 100 | 3.0 |

[1]2000 ppm Lupersol 101 used.
[2]9600 ppm Lupersol 101 used.

Adhesives were prepared using either a small Brabender compound head (approximately 50 cc capacity) or a one quart sigma blade mixer. The test formulations were easily blended using preheated equipment (170°–180° C.) by introducing the polybutylene polymer, mixing until a soft, homogeneous mass is formed, and then gradually introducing the remaining ingredients. Batch times were 20 minutes.

EXAMPLE II

Adhesive Film

Thin adhesive films (125 to 200 microns) were prepared by casting onto release coated polyester film (onto release coated side) using a pair of heated nip rolls that are adjusted to produce the desired gap, hence adhesive thickness. Preheated adhesive (at about 130° C.) was poured onto a polyester film and hand drawn through the heated nip rolls. Using this technique, adhesive films a meter in length by 15 centimeters in width were produced with a small quantity (<60 gms) of adhesive, so that very small quantities of adhesive could be evaluated.

Once cooled and allowed to set, these adhesives were used to prepare test specimens. For example, Kraft paper to Kraft paper bonds were made by cutting adhesive squares from the polyester film, peeling them off, placing the adhesive between the paper and heat sealing with a hot bar sealer (time, pressure and temperature can be adjusted). Alternately, the adhesive square or an adhesive strip may be placed on a piece of plastic or metal substrate, melted with a heat gun (or in an oven), and then joined under moderate contact pressure to form T-peel, lap shear or SAFT bonded substrate specimens.

TESTING METHODS

1. Adhesive Hot Melt Viscosity—Viscosities were measured at 177° C. in a Brookfield Thermocell Viscometer with an RVT head and Number 29 spindle (ASTM D3236); for low viscosity formulations, a number 21 spindle was used.
2. SAFT: Shear Adhesion Failure Temperature—The upper service temperature limit of the adhesive was estimated by the SAFT test. A 25×25 mm lap shear specimen was formed with the substrate of interest, the adhesive as the interlayer between the substrate surfaces. In the case of Kraft paper, National Bureau of Standards, Standard Reference Material 1810, Linerboard, was used. The lap shear specimen was suspended in a temperature programmed oven, and the free end of the specimen was loaded at 500 or 1000 gm. The temperature was programmed to rise at a rate of 22° C./hour. The SAFT was taken at the temperature at which the bond fails and the weight-load falls.
3. Lap Shear Strength—A 25×25 mm lap shear specimen was formed with the substrate of interest, the adhesive as the interlayer between the substrate surfaces. Specimens were drawn apart at a rate of 1.27 mm/min. on an Instron tester, and the maximum force required to break the bond was recorded. With the magnitude of force required to break the adhesive bonds of crystalline/olefinic polymer based recipes, substrates chosen for this test were metals. About 0.75 mm thickness (30 mils) stainless steel were used for testing. However, 3 mm (125 mils) anodized aluminum affords about an equivalent strength, and will avoid metal yield/stretch in measuring lap shear strength.
4. T-peel Adhesion—a 25 mm×150 mm laminate sandwich was formed with the substrate of interest, the adhesive as the interlayer between the substrate surfaces. The laminate surfaces were placed in an Instron tester, one surface in the upper jaw, the other surface in the lower jaw. The jaws were separated at a rate of 25 cm/min. Force required to peel the surfaces was recorded continuously. The maximum and minimum values were noted, as well as failure mode, i.e., adhesive, cohesive, or a combination. This test approximates a peel angle of about 180° C.

5. Adhesive Open Time—Open time is defined as the maximum time at which auto-adhesion (adhesion of the adhesive to itself or a substrate) can take place for a material which, after melting, is brought to room temperature. In our study open time was measure by applying test recipes as a hot melt onto two surfaces at ambient temperature, waiting the specified time, then pressing the adhesive surfaces together under moderate pressure (adhesive to adhesive). Within 10 minutes of this bond formation the surfaces were pulled slowly apart under tension. Bonds that did not fail at the adhesive/adhesive interface (as a function of time) marked maximum open time.

6. Polymer Melt Index—Melt index (abbreviated MI or M.I. throughout) was determined according to ASTM D1238, condition E, temperature (190° l C.) and load (2160 g). These conditions are typically used for EVA and polyethylene polymers.

7. Tm and Tg by Differential Scanning Colorimetry (D.S.C.)—Heating and cooling rates were 10° C./minute. Tm is the temperature at which a maximum occurs in the crystalline melting caloric peak. For resins, Tg was determined by drawing a tangent to the subtle shoulder in the heating portion of the D.S.C. cycle, determining the mid-point of this tangent, and reading the temperature at this mid point.

EXAMPLE III

Functionalized and non-functionalized polybutylene copolymers were formulated with various ingredients to make hot melt adhesion with long open times.

weight maleic anhydride for viscosity, SAFT, T-peel and lap shear results. KRATON G polymer 1657 or SEB1 diblock are present in formulations 1 through 5. All formulations except for formulation 6 contained 50% by weight Arkon P-85. Formulation number 6 contained 25% by weight Arkon P-85 and 25% by weight of atactic polypropylene (AFAX 510). All formulations contained 0.3% by weight Irganox 1010 antioxidant. It may be seen from Table III that the T-peel values are higher with the use of maleic anhydride funcionalized PB. However, it is interesting to note that 0.1% maleic anhydride modified polymer gives about the same T-peel value after seven days as does 3.0% maleic anhydride modified polymer as may be seen in formulations 3 and 4. In formulation 6, after one day the T-peel value of 20.4 was substantially near the T-peel values of other formulations after seven days. It is apparent that the addition of atactic polypropylene in this recipe produced a softer adhesive, tending to fail more cohesively, thus yielding higher initial peel values. It is readily apparent from Table III that the T-peel value, i.e., the difficulty in separation of the materials bound by the adhesive, is higher for PB which has been functionalized with maleic anhydride. The T-peel value difference between fucntionalization with 0.1% maleic anhydride and 3.0% maleic anhydride is minimal.

The reference Formulations 1,2 and 8 in Table III each showed poor T-peel values. Each contained non-functionalized 1B-coE 11.0. All three formulations showed eventual "adhesive failure" modes with time.

All other formulations contained functionalized 1B-coE 11.0 (either 0.1% by weight MA or 3.0% by weight MA). Additionally, some contained KRATON G Polymer 1657 or SEB1 diblock.

Formulations 2, 3, 4, 7 and 8 showed moderate combination failure modes-cohesive and adhesive. Formulation 2 showed acceptable T-peel values with 0.1% by weight maleic anhydride modified 1B-coE 11.0 and SEB1 diblock. Formulation 3 also contained 0.1% by weight maleic anhydride, but contained the KRATON G 1657. The T-peel value after 7 days was higher than that of Formulation 2 (SEB1 diblock) even after 30

TABLE III

Functionalized and Nonfunctionalized PB Based Polymers in Adhesives

|  | 1 | 2 | 3 | 4 | 5 | 6 | 7 | 8 |
|---|---|---|---|---|---|---|---|---|
| Nonfunctionalized, 1B-coE 11.0 ~99 M.I. | 30 | 30 |  |  |  |  |  | 50 |
| PB-M1 (0.1 MA ~48 M.I.) |  |  | 30 | 30 |  |  |  |  |
| PB-M3 (3.0 MA ~100 M.I.) |  |  |  |  | 30 | 30 | 30 |  |
| Kraton G, Polymer 1657 | 20 |  |  | 20 | 20 | 20 |  |  |
| SEB1[1] diblock |  | 20 | 20 |  |  |  | 20 |  |
| Arkon P-85 | 50 | 50 | 50 | 50 | 50 | 25 | 50 | 50 |
| Atactic Polypropylene[2] (AFAX 510) |  |  |  |  |  | 25 |  |  |
| Irganox 1010 | 0.3 | 0.3 | 0.3 | 0.3 | 0.3 | 0.3 | 0.3 | 0.3 |
| Viscosity (Pa · @ 177° C.) | 64.9 | 30.0 | 34.0 | 122.0 | 73. | 97.2 | 20. | 20. |
| SAFT, ¼ kg(AA) | 77° C. | 74° C. | 76° C. | 79° C. | 74° C. | 82° C. | 78° C. | 75° C. |
| T-Peel, (pli)[4] |  |  |  |  |  |  |  |  |
| 1 Day (high value/low value) | 2.4/0.3 | 5.1/1.2 | 9.4/2.4 | 9.6/1.3 | 18.6/4.0 | 20.4/11.3 | 10.4/7.5 | 0.9/0.2 |
| 7 Days | 15/ | 2.2/ | 10.8/ | 25.5/ | 28./ | 30./ | 24./ | 1.2/ |
| 30 Days | 3.0/ | 1.3/ | 22.0/ | 26.0/ | 24./ | 31./ | 27./ | 1.5/ |
| LAP SHEAR, (Lbs.) |  |  |  |  |  |  |  |  |
| 7 Days | 170 | 230 | 211 | 157 | 253 | 229 | 326 | 388 |
| FAILURE MODE[3] | A | B to A with time | B | B | C | C | B | B to A with time |

[1]SEB1 - styrene-coethylene butylene diblock, styrene block molecular weight is 7,500 and coethylene butylene block molecular weight is 19,000.
[2]Atactic polypropylene with some ethylene copolymer (Hercules).
[3]A - adhesive failure. C = cohesive failure. B = adhesive and cohesive failure combination.
[4]Substrate was thin block plate steel (0.0095 inches thick)

Table III illustrates the difference between the functionalized and nonfunctionalized PB based polymers and adhesives. Nonfunctionalized 1B-coE 11.0 is compared with 1B-coE 11.0 functionalized with 0.1% by days!Formulation 7 contained 30% by weight 1B-coE 11.0 functionalized with 3.0% by weight maleic anhydride. T-peel values were moderately better than those of Formulation 3 which contained only 0.1% by weight maleic anhydride. However, Formulation 7 also had less lower limit T-peel value fluctuation (7.5) than Formulation 3.

Formulations 5 and 6 are especially noteworthy. Both exhibited failure mode "C" (cohesive), the preferred mode of failure. Both contained equal amounts of 3.0% MA modified 1B-coE 11.0 polymer and KRATON G Polymer 1657 triblock. Formulation 5 contained 50% by weight Arkon P-85, while Formulation 6 contained 25% by weight Arkon P-85 and 25% by weight APP (AFAX 510). Formulation 6 showed better T-peel values than did Formulation 5, however, the T-peel values of Formulation 5 (no APP) were quite acceptable. Interestingly, Formulation 6 which contained APP, had a lower limit T-peel value of 11.3, while Formulation 5 (no APP) exhibited a lower limit T-peel value of only 4.0. Thus, Formulation 6 (APP) showed less lower limit T-peel fluctuation than did Formulation 5, however, Formulation 5 exhibited good maximum T-peel values, and, surprisingly, cohesive failure mode.

In sum, maleic anhydride containing polybutylene copolymers result in better adhesion. Addition of SEB1 diblock results in acceptable T-peel values and quite good values after 30 days even at only 0.1% MA (Formulation 2). Use of KRATON G 1657 at 3.0% MA gives a higher 1 day T-peel value and yields "cohesive" failure mode. Use of 25% by weight Resin B APP (AFAX 510) yields excellent maximum T-peel values, as well as an excellent lower limit T-peel values (11.3) at 1 day.

Thus, if "cohesive" failure is desired, a greater amount of MA should be used. If a high T-peel lower limit is desired, APP will be desired. Good T-peel maximum values may be obtained with 0.1% MA. Lap Shear values were adequate for all formulations.

TABLE IV

Comparison of Hot Melt Adhesive Opentime and Metal Adhesion with and without Maleic Anhydride

|  | 1 | 2 | 3 | 4 | 5 | 6 |
|---|---|---|---|---|---|---|
| Eastobond A3 PE Adhesive | 100 | | | | | |
| Amscomelt A132 EVA Adhesive | | 100 | | | | |
| PB-M2 (1% MA, 27 M.I.) | | | | 50 | 40 | 30 |
| Arkon P-85° C. | | | 50 | 50 | 50 | 50 |
| Shellwax 500 | | | | | 10 | 20 |
| Irganox 1010 | | | 0.3 | 0.3 | 0.3 | 0.3 |
| 1B-coE11.0 cracked (99 M.I.) | | | 50 | | | |
| Opentime (Minutes) | <1 | <1 | >300 | >300 | >20 | 20-30 |
| Adhesion to cold Anodized Aluminum | N | Y | Y | Y | Y | Y |
| Stainless Steel (316) | N | N | Y (moderate) | Y | Y | Y |
| Glass | N | N | N | Y (moderate) | Y | Y |

N no bond
Y yes there was a bond

As may be seen in Table IV, the only formulations which exhibited both long open time as well as glass and cold metal adhesion were numbers 4, 5 and 6, which contained 50%, 40% and 30% by weight, respectively, 1B-coE 11.0 cracked with 1% by weight maleic anhydride. Formulation 3, which did not show any maleic anhydride grafted onto the polybutylene, showed no adhesion to glass and only moderate adhesion to stainless steel. Numbers 4 and 5 also contained 10 and 20% by weight, respectivly, of Shellwax 500, a microcrystalline wax. Formulations #1 and #2 (polyethylene and ethylene-vinylacetate adhesives) exhibited extremely short open times of less than 1 minute, each. Number 1 did not bond to the cold aluminum or cold stainless steel, nor to the cold glass, Number 2 did not bond to the cold stainless steel or the cold glass.

Thus, formulations with Arkon P-85 and from about 30% by weight to about 50% by weight 1B-coE 11.0 cracked with 1% maleic anhydride and from about 10% by weight to about 20% by weight Shellwax 500 exhibit long open time values, as well as good adhesion to glass, as well as to cold anodized aluminum and cold stainless steel. Most preferably, 50% by weight 1B-coE 11.0 cracked with 1% maleic anhydride, 50% by weight Arkon P-85 resin, and about 0.3% antioxidant, yields an open time of greater than 300 minutes (5 hours) and exhibits moderate adhesion to glass, and good adhesion to cold anodized aluminum and stainless steel, in conjunction with very high peel strength values to steel as shown in comparing examples 2 and 3 in Table III. Such properties indicated by Numbers 4, 5 and 6 allow adhesion on glass and metal surfaces with open times on the order of anywhere from several minutes to several hours. This is particularly advantageous, for example, in auto plant assembly lines where the adhesive is applied to a large metal surface area which is not bonded to another piece of equipment until some point further down the assembly line.

In sum, use of 1B-coE 11.0 copolymer cracked with maleic anhydride yields a long open time and good bonding to aluminum, stainless steel and glass, as well as good failure modes and T-peel minimum and maximum values.

What is claimed is:

1. A hot melt adhesive with long open time comprising a blend of:
   from about 15% by weight to about 85% by weight of a maleic anhydride functionalized copolymer of butene-1 and ethylene, where the ethylene content is from about 5.5% by weight to about 10.0% by weight of said copolymer; and where said copolymer contains from about 0.05% by weight to about 5% by weight grafted maleic anhydride;
   from about 20% by weight to about 60% by weight of an aliphatic, substantially non-polar resin selected from the group consisting of $C_5$ stream resins, polyterpenes and partially hydrogenated $C_9$ hydrocarbon resins with softening points in a range of 70° C. to 125° C.;
   from about 0.1% by weight to about 0.5% by weight of a hindered phenolic antioxidant;
   from about 0% by weight to about 20% by weight of a microcrystalline wax;
   optionally, from about 0% by weight to about 35% by weight of a block copolymer which comprises at least one monalkenyl arene polymer end block and at least one substantially complete hydrogenated conjugated diene second block sufficient to give said blend flexibility and strength desired; and
   optionally, from about 0% by weight to about 40% by weight of atactic polypropylene sufficient to yield a good T-peel lower limit value.

2. A hot melt adhesive with long open time, comprising a blend of:

from about 35% by weight to about 55% by weight of a maleic anhydride functionalized copolymer of butene-1 and ethylene, where the ethylene content is about 5.5% by weight of said copolymer and where said copolymer contains about 0.1% by weight grafted maleic anhydride;

from about 35% by weight to about 55% by weight of a hydrogenated $C_9$ based resin with a softening point of about 85° C.;

from about 0.2% by weight to about 0.4% by weight tetrakis methylene(3,5-di-tert-butyl-4-hydroxyhydrocinnamate)methane;

from about 0% by weight to about 25% by weight of a block copolymer which comprises at least one monoalkenyl arene polymer end block and at least one substantially complete hydrogenated conjugated diene second block sufficient to give said blend flexibility and strength desired; and from about 0% by weight to about 30% by weight of atactic polypropylene.

3. The polymer blend of claims 1, or 2.

4. A hot melt adhesive with long open time, made by the process comprising the steps of:

grafting a copolymer of butene-1 and ethylene with from about 0.05% by weight to about 5% by weight of maleic anhydride;

adding to said functionalized copolymer from about 20% by weight to about 60% by weight of an aliphatic, substantially non-polar resin selected from the group consisting of $C_5$ stream resins, polyterpene resins and partially hydrogenated $C_9$ hydrocarbon resins with softening points in a range of 70° C. to 125° C. and from about 0.1% by weight to about 0.5% by weight of a hindered phenolic antioxidant;

adding from about 0% by weight to about 20% by weight of a microcrystalline wax, from about 0% by weight to about 35% by weight of a block copolymer which comprises at least one monoalkenyl arene polymer end block and at least one substantially complete hydrogenated conjugated diene second block, and from about 0% by weight to about 40% by weight of atactic polypropylene; and mixing said functionalized copolymer, said resin and any of said microcrystalline wax, said block copolymer, or said atactic polypropylene into an adhesive mixture to ensure a homogeneous mixture.

* * * * *